United States Patent [19]

Kim et al.

[11] 4,026,845

[45] May 31, 1977

[54] METHOD OF REDUCING THE FOAM DENSITY OF SILICONE FOAMS AND COMPOSITIONS

[75] Inventors: Yung K. Kim; Chi-Long Lee; Gary M. Ronk, all of Midland, Mich.

[73] Assignee: Dow Corning Corporation, Midland, Mich.

[22] Filed: July 14, 1975

[21] Appl. No.: 595,912

[52] U.S. Cl. .................... 260/2.5 S; 260/29.1 SB; 260/2.5 L; 260/2.5 D; 260/46.5 H; 260/46.5 UA; 260/46.5 G; 260/825

[51] Int. Cl.² .......................................... C08J 9/02

[58] Field of Search ....... 260/29.1 SB, 825, 46.5 H, 260/46.5 UA, 46.56, 2.5 S

[56] References Cited

UNITED STATES PATENTS

| | | | |
|---|---|---|---|
| 3,730,931 | 5/1973 | Simoneau et al. | 260/2.5 S |
| 3,798,189 | 3/1974 | Simoneau et al. | 260/2.5 S |
| 3,814,706 | 6/1974 | Simoneau et al. | 260/2.5 S |
| 3,923,705 | 12/1975 | Smith | 260/2.5 S |

*Primary Examiner*—Morton Foelak
*Attorney, Agent, or Firm*—Roger H. Borrousch

[57] ABSTRACT

Mixing a fluorinated surfactant with a silicone foam composition decreases the density of the cured foam. Increasing the amount of fluorinated surfactant decreases the foam density. Silicone compositions comprising a hydroxylated organosiloxane, an organohydrogensiloxane, a platinum catalyst and a fluorinated surfactant cure to foams with lower densities than the same compositions without the fluorinated surfactant. The cured foams can be used in the same applications as other silicone foams.

11 Claims, No Drawings

METHOD OF REDUCING THE FOAM DENSITY OF SILICONE FOAMS AND COMPOSITIONS

BACKGROUND OF THE INVENTION

This invention relates to a method of reducing the density of silicone foams and compositions therefor.

Silicone foams are known in the art and a spectrum of densities have been made. It would be convenient, however, to have the ability to use a variety of densities, but to accomplish this, one usually is required to make substantial ingredient alterations in the foamable composition. It was entirely unexpected that a class of surfactants could be added to a given silicone composition to decrease the density of the resulting cured foam. Thus, one can use a single composition and obtain a variety of densities.

SUMMARY OF THE INVENTION

It is an object of this invention to provide a method of reducing the density of a silicone foam.

This invention relates to a method of reducing the density of a silicone foam by mixing with the foamable silicone composition a fluorinated surfactant. Compositions which cure to foams and contain fluorinated surfactants provide foams with lower densities than those which do not contain the surfactant.

DESCRIPTION OF THE INVENTION

This invention relates to a method of reducing the density of a silicone foam comprising mixing with a foamable silicone composition, a fluorinated surfactant where increasing the amount of surfactant decreases the cured foam density.

Silicone foam compositions used in this invention are known in the art. These silicone foam compositions can be room temperature or heat activated silicone foam compositions. They can be packaged in a single container or in two or more packages. The latter case is where the contents of the two packages are mixed to provide the foamable silicone composition, particularly where the composition foams and cures at room temperature. Many silicone foams are known in the art, such as those described in U.S. Pat. No. 3,070,555, U.S. Pat. No. 3,338,847, U.S. Pat. No. 3,429,838, U.S. Pat. No. 2,956,032, U.S. Pat. No. 3,428,580, U.S. Pat. No. 2,875,163, U.S. Pat. No. 2,951,819, U.S. Pat. No. 3,271,332, U.S. Pat. No. 3,425,967 and U.S. Pat. No. 3,677,981.

A particularly useful class of foamable silicone compositions are those which comprise a hydroxylated organosiloxane, an organohydrogensiloxane and a platinum catalyst. Foamable silicone compositions of this class are described by Schuyler B. Smith in an application Ser. No. 519,380, filed Oct. 30, 1974, now U.S. Pat. No. 3,923,705 and assigned to the same assignee as this application which application is hereby incorporated by reference to show silicone foam compositions.

Smith describes preparing organosiloxane foams by mixing an organohydrogensiloxane having an average of at least three silicon-bonded hydrogen atoms per molecule, an average of no more than one silicon-bonded hydrogen atom per silicon atom and organic radicals selected from the group consisting of alkyl radicals having from one to six carbon atoms per radical, phenyl and 3,3,3-trifluoropropyl radicals, a hydroxylated organosiloxane having an average of from greater than 1.0 to 2.5 silicon-bonded hydroxyl radicals per molecule and having an average of at least one organic radical per silicon atom selected from the group consisting of alkyl radicals having from one to six carbon atoms per radical, phenyl and 3,3,3-trifluoropropyl radicals and a platinum catalyst in an amount of from 5 to 200 parts by weight platinum per one million parts by weight total composition, said organohydrogensiloxane and said hydroxylated organosiloxane being present in sufficient amounts to provide a molar ratio of silicon-bonded hydrogen atoms to silicon-bonded hydroxyl radicals of 2.5 to 40, where a mixture is obtained having a viscosity of less than 100,000 cs. at 25° C. This mixture foams and cures at room temperature to form a silicone foam.

Silicone foams having an open-cell structure are described in an application Ser. No. 595,915, by Chi-Long Lee and Gary M. Ronk, entitled, "Method of Preparing Fire Retardant Open-Cell Siloxane Foams and Foams Prepared Therefrom", filed on even date herewith, July 14, 1975, and assigned to the same assignee as this application. Lee and Ronk in this application describe an improvement over the Smith composition by having present in the composition in organomonohydrogensiloxane having one silicon-bonded hydrogen atom per molecule where the organomonohydrogensiloxane is present in an amount sufficient enough to provide a molar ratio of silicon-bonded hydrogen atoms from the organohydrogensiloxane to silicon-bonded hydrogen atoms from the organomonohydrogensiloxane of from 0.4/1 to 2/1 and the molar ratio of total silicon-bonded hydrogen atoms present in the mixture to silicon-bonded hydroxyl radicals is from 2.5/1 to 7/1.

Lee and Ronk also describe a heat cured organosiloxane foam in an application Ser. No. 595,914 entitled "Method of Preparing Heat Cured Siloxane Foams and Foams Prepared Therefrom" filed on even date herewith, July 14, 1975, and assigned to the same assignee as this application. Lee and Ronk in this application describe foamable silicone compositions having present from 0.0006 to 0.0030 mol of platinum catalyst inhibitor per 100 grams of the hydroxylated organosiloxane. The platinum catalyst inhibitors can be 3,5-dimethyl-1-hexan-3-ol, 3-phenyl-1-butyn-3-ol, 3-methyl-1-pentyn-1-ol, 1-ethynylcyclohexan-1-ol, 3-methyl-1-butyn-3-ol or a polyorganosiloxane having 3 to 10 siloxane units in which (a) at least one siloxane unit is selected from RHSiO and
R$_2$HSiO$_{0.5}$
and (b) at least one siloxane unit is selected from

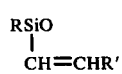

and

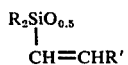

where each siloxane unit of (c) does not exceed three siloxane units, R is a monovalent hydrocarbon radical or perfluoroalkylethylene radical both having no more than six carbon atoms and R' is a monovalent hydrocarbon radical having a secondary or tertiary hydroxy substitution and no more than ten carbon atoms. The polyorganosiloxane platinum catalyst inhibitors are described in U.S. patent application Ser. No. 528,966, filed Dec. 2, 1974 by Chi-Long Lee and Ollie W. Marko and assigned to the same assignee as this application, which is hereby incorporated by reference to show the preparation and further details of these polyorganosiloxane inhibitors.

Lee and Ronk have described spongeable silicone compositions in an application Ser. No. 595,918 entitled "Spongeable Silicone Gum Stock" filed on even date herewith, July 14, 1975, and assigned to the same assignee as this application. Lee and Ronk in this application describe a spongeable silicone composition comprising 100 parts by weight of a polydiorganosiloxane gum base stock, 15 to 60 parts by weight of an organosiloxane having an average of at least 2 silicon-bonded hydroxyl radicals per molecule with from 0.5 to 3 parts by weight silicon-bonded hydroxyl radical present, 3 to 25 parts by weight of an organohydrogensiloxane having an average of at least 2.5 silicon-bonded hydrogen atoms per molecule with from 0.01 to 0.5 parts by weight of an acetylenic alcohol inhibitor, and 5 to 20 parts by weight platinum per one million parts by weight silicone composition where the platinum is in the form of a platinum catalyst where the molar ratio of silicon-bonded hydrogen atoms to silicon-bonded hydroxyl radicals is from 1 to 5.

The three Lee and Ronk applications discussed above are hereby incorporated by reference to show examples of the class of foamable silicone compositions containing a hydroxylated organosiloxane, an organohydrogensiloxane and a platinum catalyst.

The fluorinated surfactants can be any of those compounds known in the art which contain fluorine atoms on carbon and are also surfactants. These fluorinated surfactants can be organic or silicon containing. For example, fluorinated organic surfactants can be perfluorinated polyethers such as those which have repeating units of the formulae

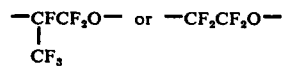

and mixtures of such units. Silicon-containing fluorinated surfactants can be siloxanes, for example, which contain organic radicals having fluorine bonded thereto, such as siloxanes having repeating units of the formulae

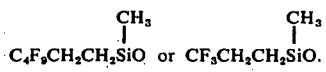

The fluorinated surfactants when added to the foamable silicone compositions decrease the cured foam density. Increasing the amount of fluorinated surfactant in any given foamable silicone composition decreases the density of the cured foam. Thus, by increasing this amount of fluorinated surfactant from 0.01 up to 10 parts by weight in a composition based on 100 parts by weight of a polydiorganosiloxane as the base polymer the results are that the cured foam has a lower density at 10 parts by weight than at 0.01 part by weight.

The method of reducing the density of a silicone foam for any given composition is advantageous because the variations in foam densities can be obtained from one foamable silicone composition by merely varying the fluorinated surfactant and thus the number of materials stored by a user can be reduced. Thus, the densities could be changed during a single day on an assembly line without much concern about cleaning up equipment. The resulting foams can be used for cushioning, insulation, sealing and the like. The foams which contain platinum, particularly platinum and small amounts of carbon black will be flame retardant and thus have added advantages for use in confined places where people or valuables may be present. In these platinum containing foamable compositions the fluorinated surfactants can be used without sacrificing the flame retardancy property of the foams.

The foamable compositions of this invention can contain other ingredients such as described in the patents and applications cited herein, such as fillers, colorants, heat stability additives and the like.

The following examples are presented for illustrative purposes only and should not be construed as limiting the present invention which is properly delineated in the claims.

EXAMPLE 1

A foamable silicone composition was prepared by mixing 100 parts by weight of a hydroxyl endblocked polydimethylsiloxane having a viscosity of about 12,500 centipoise at 25° C., 11.1 parts by weight of a hydroxyl endblocked polydimethylsiloxane having about four weight percent silicon-bonded hydroxyl radicals, 11.1 parts by weight of a trimethylsiloxy endblocked polymethylhydrogensiloxane having about 1.6 weight percent silicon-bonded hydrogen atoms, 0.05 part by weight of polymethylvinylsiloxane cyclics, and about 15 parts by weight platinum per one million parts by weight of silicone composition where the platinum was in the form of a chloroplatinic acid catalyst complex with symetrical divinyltetramethyldisiloxane and X parts by weight of a siloxane surfactant having the unit formula

The amounts of surfactant used in each composition was as shown in Table I with the corresponding densities of the cured foams which were obtained at room temperature by mixing the ingredients.

Table I

| X | Density, grams/cubic centimeter |
|---|---|
| 0.01 | 0.21 |
| 1.5 | 0.20 |
| 5.6 | 0.15 |

EXAMPLE 2

The composition of Example 1 was repeated except Y parts by weight of a perfluorinated polyether of the unit formula

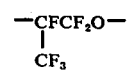

was used in place of the surfactant of Example 1. The results were as shown in Table II.

Table II

| Y | Density, grams/cubic centimeter |
|---|---|
| 0 | 0.21 |

Table II-continued

| Y | Density, grams/cubic centimeter |
|---|---|
| 0.1 | 0.16 |
| 5.6 | 0.14 |

EXAMPLE 3

The composition of Example 1 was repeated except Z parts by weight polymethyl-3,3,3-trifluoropropyl-siloxane cyclics was used in place of the surfactant of Example 1. The results were as shown in Table III.

Table III

| Z | Density, grams/cubic centimeter |
|---|---|
| 0.01 | 0.21 |
| 1.5 | 0.20 |
| 5.0 | 0.15 |

EXAMPLE 4

The composition of Example 1 was repeated except $X^1$ parts by weight of a siloxane surfactant was used in place of the surfactant of Example 1. The siloxane surfactant had a formula

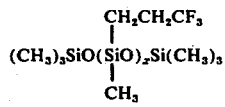

where $x$ had an average value of about 26. The results were as shown in Table IV.

Table IV

| $X^1$ | Density, grams/cubic centimeter |
|---|---|
| 0.01 | 0.21 |
| 2.0 | 0.20 |
| 10.0 | 0.19 |

EXAMPLE 5

A foamable silicone composition was prepared by mixing 100 parts by weight of a hydroxyl endblocked polydimethylsiloxane having a viscosity of about 2000 centipoise at 25° C., 5 parts by weight of a dimethylvinylsiloxy endblocked polydimethylsiloxane having a Williams plasticity between 0.055 and 0.065 inch, 25 parts by weight of diatomaceous earth, 11.3 parts by weight of a hydroxyl endblocked polydimethylsiloxane having about four weight percent silicon-bonded hydroxyl radicals, 11.3 parts by weight of a trimethylsiloxy endblocked polymethylhydrogensiloxane having about 1.6 weight percent silicon-bonded hydrogen atoms, 0.05 part of polymethylvinylsiloxane cyclics, 11 parts by weight platinum per one million parts by weight silicone composition where the platinum was added in the form of a chloroplatinic acid catalyst complex of symmetrical divinyltetramethyldisiloxane and $Y^1$ parts by weight of a perfluorinated polyether of the unit formula as described in Example 2. The room temperature foamed and cured product had densities as shown in Table V for the amount of polyether added.

Table V

| $Y^1$ | Density, grams/cubic centimeter |
|---|---|
| 0.06 | 0.20 |

Table V-continued

| $Y^1$ | Density, grams/cubic centimeter |
|---|---|
| 1.1 | 0.19 |
| 5.6 | 0.17 |

That which is claimed is:
1. A method of reducing the density of a silicone foam comprising mixing with a foamable silicone composition having a base polydiorganosiloxane, a fluorinated surfactant selected from the group consisting of perfluorinated polyethers and silicon-containing fluorinated surfactants having repeating units of the formulae

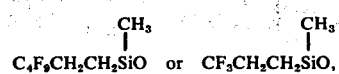

and foaming and curing to obtain a cured silicone foam.

2. The method in accordance with claim 1 in which the fluorinated surfactant is a perfluorinated polyether.

3. The method in accordance with claim 2 in which the perfluorinated polyether has a unit formula of

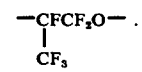

4. The method in accordance with claim 3 in which the perfluorinated polyether is present in an amount of from 0.01 to 10 parts by weight based on 100 parts of a base polydiorganosiloxane in the foamable silicone composition.

5. The method in accordance with claim 1 in which the fluorinated surfactant is a silicon-containing fluorinated surfactant.

6. The method in accordance with claim 5 in which the silicon-containing fluorinated surfactant has a unit formula of

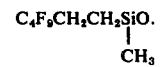

7. The method in accordance with claim 5 in which the silicon-containing fluorinated surfactant has a general formula

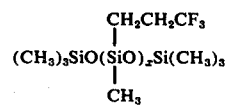

wherein $x$ has an average value from 10 to 50.

8. A foamable silicone composition comprising a composition obtained by mixing
   A. a hydroxylated organosiloxane having at least two silicon-bonded hydroxyl radicals per molecule,
   B. an organohydrogensiloxane having an average of at least 2.5 silicon-bonded hydrogen atoms per molecule,
   C. a platinum catalyst, and
   D. a fluorinated surfactant selected from the group consisting of perfluorinated polyethers and silicon-containing fluorinated surfactants having repeating units of the formulae

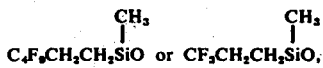

where there is from 1 to 40 silicon-bonded hydrogen atoms per silicon-bonded hydroxyl radicals.

9. The foamable silicone composition according to claim 8 in which the fluorinated surfactant is a perfluorinated polyether.

10. The foamable silicone composition according to claim 8 in which the fluorinated surfactant is a silicon-containing fluorinated surfactant.

11. A method of reducing the density of a silicone foam comprising mixing

A. a hydroxylated organosiloxane having at least two silicon-bonded hydroxyl radicals per molecule, B. an organohydrogensiloxane having an average of at least 2.5 silicon-bonded hydrogen atoms per molecule, C. a platinum catalyst, and D. a fluorinated surfactant selected from the group consisting of perfluorinated polyethers and silicon-containing fluorinated surfactants having repeating units of the formulae

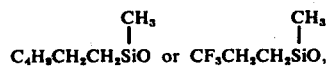

where there is from 1 to 40 silicon-bonded hydrogen atoms per silicon-bonded hydroxyl radicals, and foaming and curing to obtain a cured silicone foam.

* * * * *

UNITED STATES PATENT AND TRADEMARK OFFICE
CERTIFICATE OF CORRECTION

PATENT NO. : 4,026,845
DATED : May 31, 1977
INVENTOR(S) : Yung K. Kim; Chi-Long Lee; Gary M. Ronk It is certified that error appears in the above-identified patent and that said Letters Patent are hereby corrected as shown below:

Column 2, line 23 - the word "in" should read "an".

Column 2, line 59 - insert the following phrase "where the sum of siloxane units in (a) and (b) is at least three siloxane units and (c) any remaining siloxane units are $R_3SiO_{0.5}$, $SiO_2$ or $RSiO_{1.5}$"

Column 3, line 19 - after the word "weight" insert "silicon-bonded hydrogen atoms present, 0.05 to 0.5 parts by weight"

Column 3, line 56 - the word "this" should read "the"

Signed and Sealed this

Eighth Day of December 1981

[SEAL]

Attest:

Attesting Officer

GERALD J. MOSSINGHOFF
Commissioner of Patents and Trademarks